United States Patent
Hong et al.

(10) Patent No.: US 11,379,587 B2
(45) Date of Patent: Jul. 5, 2022

(54) METHOD AND SYSTEM FOR SETTING ELECTRONIC CONTROLLER SECURITY FUNCTION

(71) Applicant: FESCARO CO., LTD., Ulsan (KR)

(72) Inventors: Seok Min Hong, Daejeon (KR); Hyun Jeong Lee, Namyangju-si (KR)

(73) Assignee: FESCARO CO., LTD., Ulsan (KR)

( * ) Notice: Subject to any disclaimer, the term of this patent is extended or adjusted under 35 U.S.C. 154(b) by 230 days.

(21) Appl. No.: 16/728,223

(22) Filed: Dec. 27, 2019

(65) Prior Publication Data

US 2020/0134186 A1 Apr. 30, 2020

Related U.S. Application Data

(63) Continuation of application No. PCT/KR2018/006770, filed on Jun. 15, 2018.

(30) Foreign Application Priority Data

Jun. 30, 2017 (KR) .................. 10-2017-0083825

(51) Int. Cl.
  *G06F 15/177* (2006.01)
  *G06F 9/00* (2006.01)
  (Continued)

(52) U.S. Cl.
  CPC ............ *G06F 21/572* (2013.01); *G06F 21/31* (2013.01); *G06F 21/51* (2013.01); *G06F 21/575* (2013.01); *H04W 12/10* (2013.01)

(58) Field of Classification Search
  CPC ........ G06F 21/572; G06F 21/31; G06F 21/51; G06F 21/575; G06F 2221/033;
  (Continued)

(56) References Cited

U.S. PATENT DOCUMENTS

| 2006/0155941 A1 | 7/2006 | Yamaguchi |
| 2009/0083531 A1 | 3/2009 | Zhou et al. |

(Continued)

FOREIGN PATENT DOCUMENTS

| JP | 2017-059211 A | 3/2017 |
| KR | 10-2013-0076519 A | 7/2013 |
| KR | 10-2016-0117731 A | 10/2016 |

OTHER PUBLICATIONS

PCT International Search Report and Written Opinion for PCT Application No. PCT/KR2018/006770 dated Sep. 21, 2018, 11 pages.

*Primary Examiner* — Xuxing Chen
(74) *Attorney, Agent, or Firm* — Burris Law, PLLC

(57) ABSTRACT

Provided is an electronic control unit (ECU) security function setting system including an ECU and a tester connected to the ECU through a communication network. The tester includes a security function requester configured to request a security function loader to the ECU when the ECU is in a security function setting mode; an user authenticator configured to receive a user authentication request from the ECU and perform an user authentication; and a firmware transmitter configured to transmit stored security function firmware to the ECU when the user authentication is passed, and the ECU activates an instruction present in the received security function firmware and perform a security function setting.

11 Claims, 4 Drawing Sheets

(51) Int. Cl.
  *G06F 21/57*   (2013.01)
  *G06F 21/31*   (2013.01)
  *G06F 21/51*   (2013.01)
  *H04W 12/10*   (2021.01)
(58) Field of Classification Search
  CPC ... H04W 12/10; H04W 12/106; H04W 12/06; H04W 12/35
  See application file for complete search history.

(56) References Cited

U.S. PATENT DOCUMENTS

2016/0371881 A1* 12/2016 Tokuyoshi .............. G06T 15/04
2018/0129503 A1*  5/2018 Narayan ............ H03K 19/0175
2018/0270196 A1*  9/2018 Bathurst ................. H04L 63/14
2018/0357118 A1* 12/2018 Jang .................... G06F 11/0724

\* cited by examiner

METHOD AND SYSTEM FOR SETTING ELECTRONIC CONTROLLER SECURITY FUNCTION

CROSS-REFERENCE TO RELATED APPLICATION(S)

This application is a continuation of PCT Application No. PCT/KR2018/006770, filed on Jun. 15, 2018, which claims priority to Korean Patent Application No. 10-2017-0083825, filed on Jun. 30, 2017, the disclosures of which are hereby incorporated by reference in their entireties.

TECHNICAL FIELD

The disclosure relates to electronic control unit (ECU) security function setting method and system, and more particularly, to an ECU security function setting method and system for receiving security function firmware from an external tester that passed an authentication, checking the integrity of the security function firmware, and setting a security function of an ECU.

BACKGROUND

In general, with the rapid development of electronic control technology, various devices in automobiles that were operated by mechanical methods are now driven by electrical methods for reasons including driver convenience and driving safety, and system for automobiles is being advanced more and more. In particular, as systems of vehicles become fully automated, communications between electronic control units (ECUs) in a vehicle are also frequently performed. A controller area network (CAN) communication is commonly used for in-vehicle communication.

In other words, an electronic control system inside a vehicle includes dozens of ECUs, such as an engine ECU, a transmission ECU, a brake ECU, and an airbag ECU. Also, each ECU includes a CAN controller for CAN communication, and communications between these ECUs use CAN communication.

Meanwhile, each ECU inside a vehicle may become a target of a hacking attack and may include a security function to block such a hacking attack. The security function setting of an ECU requires a blocking measure to become inaccessible to hackers. At this time, ECU security function setting may differ in a development stage and a production and release stage, and security levels required for each stage may also differ. For example, a debugger connection needs to be allowed for development and testing purposes in the development stage, but a debugger connection needs to be limited in the production and release stage. Also, security functions for protecting an ECU and internal firmware need to be deactivated in the development stage, but the security functions need to be activated in the production and release stage. In other words, it is necessary to efficiently manage activation of security functions in each stage.

SUMMARY

The disclosure provides prevention of an electronic control unit (ECU) from activating a security function by itself by receiving a security function firmware from an external tester that passed an authentication, checking the integrity of the security function firmware, and enabling security functions of the ECU to be set.

The disclosure also provides a watchdog timer-based monitoring in case of setting ECU security functions.

According to an aspect of the disclosure, there is provided an electronic control unit (ECU) security function setting system including an ECU and a tester connected to the ECU through a communication network. The tester includes a security function requester configured to request a security function loader to the ECU when the ECU is in a security function setting mode; an user authenticator configured to receive a user authentication request from the ECU and perform an user authentication; and a firmware transmitter configured to transmit stored security function firmware to the ECU when the user authentication is passed, and the ECU activates an instruction present in the received security function firmware and perform a security function setting.

In the disclosure, the ECU and the tester operate as watchdog-based instruction interpreters.

In the disclosure, the ECU temporarily loads the received security function firmware to a volatile memory region of the ECU.

In the disclosure, an instruction present in the security function firmware may be an instruction related to storing, changing, or deleting values in a protected memory region present in a non-volatile memory of the ECU.

In the disclosure, the ECU may check the integrity of the received security function firmware during transmission and reception through the communication network, and then activate an instruction in the security function firmware.

According to an aspect of the disclosure, there is provided an electronic control unit (ECU) security function setting method including requesting a security function loader to an ECU when the ECU is in a security function setting mode; performing receiving a user authentication request from the ECU and performing an user authentication; transmitting stored security function firmware to the ECU when the user authentication is passed; checking the integrity of the received security function firmware during transmission and reception through a communication network; temporarily loading the received security function firmware to a volatile memory region of the ECU; and activating an instruction present in the received security function firmware and performing a security function setting.

According to another aspect of the disclosure, there is provided a computer program recorded on a computer readable recording medium to implement the method.

According to the disclosure, an ECU may be prevented from arbitrarily changing security function-related settings by itself, and thus hacking attacks may be blocked.

According to the disclosure, security may be improved by performing a watchdog timer-based monitoring in case of setting ECU security functions.

DETAILED DESCRIPTION

Figure 1:
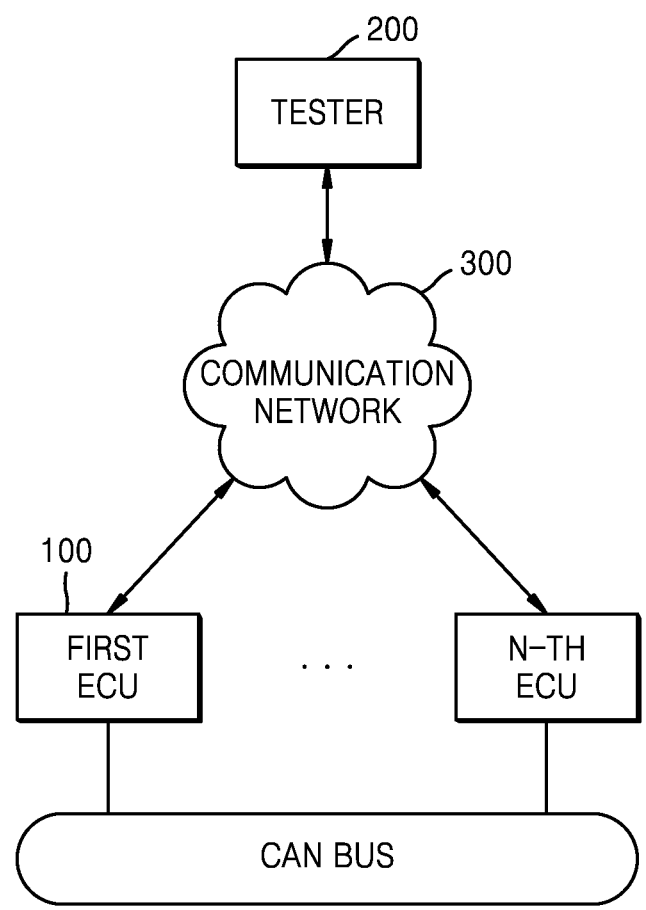
FIG. 1 is a block diagram showing the configuration of a CAN communication according to an embodiment of the disclosure.

The detailed description of the disclosure below refers to the accompanying drawings that show, by way of illustration, specific embodiments in which the disclosure may be practiced. These embodiments are described in sufficient detail to enable those skilled in the art to practice the disclosure. It is to be understood that the various embodiments of the disclosure are different but need not be mutually exclusive. For example, certain shapes, structures, and characteristics described herein may be implemented with changes from one embodiment to another without departing from the spirit and scope of the disclosure. Also, it is to be understood that the location or arrangement of individual components within each embodiment may be changed without departing from the spirit and scope of the disclosure. Accordingly, the following detailed description is not to be taken in a limiting sense, and the scope of the disclosure should be taken as encompassing the scope of the claims of the claims and all equivalents thereto. Like reference numerals in the drawings denote the same or similar elements throughout the several aspects.

Hereinafter, various embodiments of the disclosure will be described in detail with reference to the accompanying drawings so that those skilled in the art may easily implement the disclosure.

FIG. 1 is a block diagram showing the configuration of a CAN communication according to an embodiment of the disclosure.

Referring to FIG. 1, a CAN communication of the disclosure includes a CAN bus for data transmission and reception, a plurality of electronic control units (ECUs) 100 connected to the CAN bus, a tester 200, and a communication network that provides a communication channel between the ECUs 100 and the tester 200.

The CAN bus is a communication line for data transmission and may include a twisted pair wire. Here, two wires constituting the twisted pair wire are driven by different signals CAN_H and CAN_L, respectively. Transmission rate on the CAN bus may vary depending on the length of the bus.

Also, the CAN bus is divided into a transmission line Tx and a reception line Rx, and each ECU 10 transmits a message through the transmission line Tx and receives a message through the reception line (Rx). In particular, all the ECUs 100 are connected to common transceiver line (Tx, Rx) of the CAN bus 50 to transmit and receive messages.

Meanwhile, a CAN communication of the disclosure may be applied not only to a common CAN communication, but also to an extended CAN and a CAN with flexible data-rate (CAN-FD). Also, the CAN communication of the disclosure may be mounted on a vehicle, a construction heavy equipment, a tractor, etc., and the ECU security function setting method of the disclosure may also be applied to anything including an ECU, such as a vehicle, a heavy construction equipment (an excavator, a forklift, a bulldozer, a loader, etc.), agricultural equipment (e.g., a tractor), and a drone.

The plurality of ECUs 100 or first to N-th ECUs 100 may be connected to the CAN bus via a predetermined CAN connector, wherein, theoretically, the maximum number of ECUs that may be connected to one CAN communication is 2032.

The ECUs 100 may be classified into ECUs that are connected to external communication networks like smart phones, the internet, and traffic information systems and are directly exposed to security risks and ECUs that are not directly connected to an external communication network and are relatively safe.

The former ECUs 100 are multimedia CAN and are ECUs related to telematics, navigation, etc. These ECUs are connected to external communication networks, such as smart phones, the internet, and traffic information systems, and perform data communication. Therefore, the ECUs 100 are ECUs accessible from an external terminal or system.

On the other hand, the latter ECUs 100 are mainly typical ECUs known in the art and are ECUs for controlling the internal system of a vehicle. For example, the latter ECUs include ECUs related to power trains like engines and transmissions; ECUs related to the chassis, such as a brake, a steering, and airbags; and ECUs related to the body, such as clusters, doors, and windows. Commonly, these are also referred to as a P-CAN, a C-CAN, and a B-CAN, respectively.

A tester 200 may request a security function loader instruction to the ECU 100 according to an embodiment of the disclosure, and, when a user authentication for the tester 200 is completed, the tester 200 may transmit security function firmware to the ECU 100. In other words, the tester 200 according to an embodiment of the disclosure may be an external tester that is capable of transmitting a security function firmware that is not built in the ECU 100 after authentication.

The communication network 300 is a communication network providing a connection channel between the ECU 100 and the tester 200, and a general communication network, such as an UART, an ETHERNET, a CAN, and a CAN-FD, may be used.

The disclosure relates to a method and a system for setting an ECU security function based on a CAN network. The ECU 100 according to an embodiment of the disclosure may have a normal mode for normal operations and a special mode for setting a security function. In the disclosure, the security function refers to a function for modifying contents stored in a protected memory, activating or deactivating the security function, or temporarily disabling the security function (however, the security function may be re-enabled after an ECU is reset).

In detail, when a particular condition is satisfied when the boot mode of the ECU 100 is executed (e.g., when the ECU is powered on), the ECU 100 may enter the special mode from the normal mode. The particular condition may be to set a specific boot mode setting value in a non-volatile memory region or to trigger an electrical signal that satisfies the particular condition for at least one pin value in an ECU connector.

According to an embodiment of the disclosure, when entering a special mode for setting the security function, the ECU 100 and the tester 200 may operate as instruction interpreters. In other words, according to an embodiment of the disclosure, the ECU 100 and the tester 200 may transmit an instruction request from the tester 200 to the ECU 100 and a response from the ECU 100 to the tester 200 through a communication channel.

In detail, the ECU 100 and the tester 200 according to an embodiment of the disclosure may monitor a single instruction processing time and an instruction request waiting time based on a watchdog timer when operated as instruction interpreters. For example, when a requested instruction is not processed or there is no instruction request for a certain time, a watchdog timer expires, and thus the ECU 100 is forced to exit from the special mode for setting the security function. In other words, when the watchdog timer expires and is reset, the ECU 100 enters the normal mode from the special mode. When the ECU 100 monitors an instruction processing time and an instruction request waiting time based on a watchdog timer as in the disclosure, it may prevent the hacker from forcibly incapacitating the ECU 100 to be unable to normally perform the original functions of the ECU 100, thereby improving security.

Hereinafter, the disclosure will be described in more detail based on the internal configuration of the ECU 100.

Figure 2:
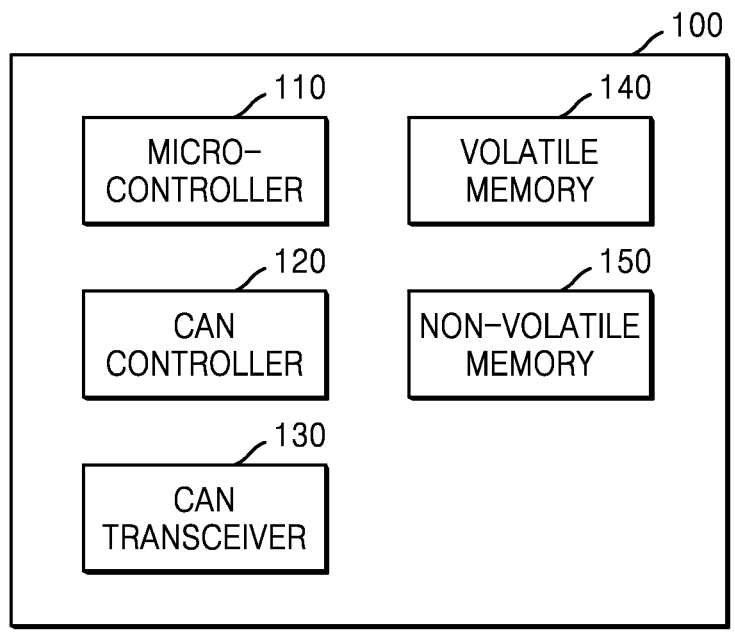
FIG. 2 is a block diagram showing the configuration of an ECU according to an embodiment of the disclosure.

FIG. 2 is a block diagram showing the configuration of an ECU according to an embodiment of the disclosure.

Referring to FIG. 2, the ECU 100 may include a microcontroller (CPU) 110, a CAN controller 120, a CAN transceiver 130, a volatile memory 140, and a non-volatile memory 150.

The microcontroller 110 may be equipped with a CPU, provide a higher layer protocol, and provide various applications. Also, the microcontroller 110 may authenticate the tester 200 in a special mode for setting a security function as described below and load security function firmware onto a volatile memory to activate instructions existing in the security function firmware. Also, although FIG. 2 shows that the volatile memory 140 and the non-volatile memory 150 are provided outside the microcontroller 110, according to an embodiment of the disclosure, the volatile memory 140 and the non-volatile memory 150 may be included in the microcontroller 110. The microcontroller 110 will be described below in more detail with reference to FIG. 4.

The CAN controller 30 may transmit and receive a CAN protocol message and perform a message filtering function on transmitted and received messages. Also, the CAN controller 30 provides a message buffer for re-transmission control and an interface function with the microcontroller 40.

The CAN transceiver 130 is connected to the CAN bus through a predetermined CAN connector and constitutes a physical layer of an ECU. The CAN transceiver 130 may provide a function of detecting and managing a failure of the CAN bus and a function of transmitting and receiving a message.

The volatile memory 140 is a memory that requires electricity to maintain stored information, and the volatile memory 140 of the disclosure may be a common volatile memory, such as a random access memory (RAM), a dynamic RAM, and a static RAM. Security function firmware provided by the tester 200 may be loaded in the volatile memory 140 of the disclosure. Due to the characteristics of the volatile memory 140, the loaded security function firmware disappears when the ECU 100 is reset.

The non-volatile memory 150 is a memory that maintains stored information even when power is not supplied, and the non-volatile memory 150 of the disclosure may be a common non-volatile memory such as a read only memory (ROM) and a flash memory.

According to an embodiment of the disclosure, a portion of the memory space of the non-volatile memory 150 may be designated as a protected memory. In general, the non-volatile memory 150, such as a flash memory, includes a plurality of sectors, and each sector may be accessed by developers at an address defined in a memory address map. On the contrary, a protected memory is a hidden region inside the non-volatile memory 150 that requires a password and a particular command sequence to change a protected memory region, e.g., read, write, or delete. The method of changing a protected memory region may vary from one manufacturer of non-volatile memory 150 to another.

Alternatively, a common region may be used as a protected memory for security purposes even when there is no hidden region designated in the non-volatile memory 150. As described above, the non-volatile memory 150 includes a plurality of sectors, and read or write protection may be set for each sector. A particular sector may be designated as a protected memory region and the particular sector may be made as a protected memory by setting read/write protection to the particular sector. In this case, the memory region is prohibited from reading and writing. An instruction fetch used to execute an instruction is allowed, but an access to the memory region through an address value is blocked. A password may be set to a memory region set to be protected to allow only authorized users to read and write, and thus the corresponding memory region may be used as a protected memory.

The protected memory in the non-volatile memory 150 stores information that is important for the ECU 100 and needs to be protected from hacking attacks. In this case, information stored in the protected memory may be security function setting values, learned values used for a security function operation, an ECU password, an encryption key value, etc. In detail, the security function setting values may be setting values related to memory protection, such as a flash memory read/write protection setting or an One-TimeProgrammable. In addition, the learned values used for a security function operation may be ID filter values used when an ECU transmits and receives messages from a CAN network, learned value for messages corresponding to the same ID, and ECU state learned values.

Since the information stored in the protected memory as described above is very important, a problem may occur when modified by an unauthorized person. Therefore, in the method of setting a security function according to an embodiment of the disclosure, a function for modifying a protected memory is removed when the ECU 100 is released and the protected memory is allowed to be modified only by receiving security function firmware from the tester 200. This may prevent leaking of a protected memory control scheme through firmware extraction and reverse engineering by a hacker.

Hereinafter, a security function setting method of the disclosure will be described in detail with reference to the internal configurations of the tester 200 and the microcontroller 110.

Figure 3:
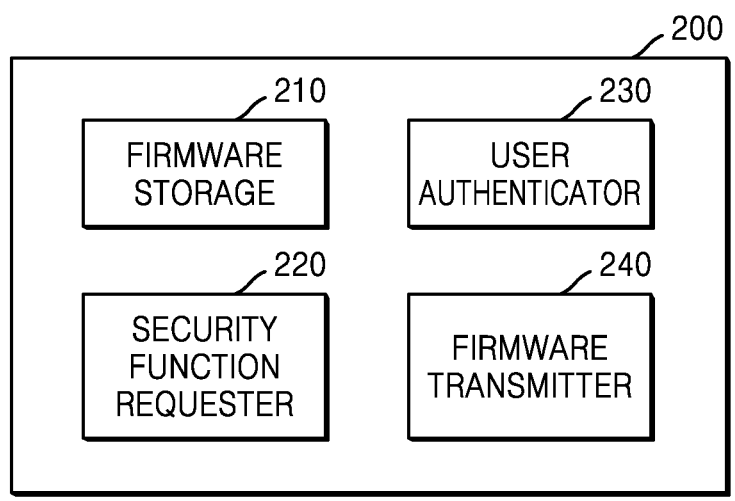
FIG. 3 is a block diagram showing an internal configuration of a tester according to an embodiment of the disclosure.

FIG. 3 is a block diagram showing an internal configuration of the tester 200 according to an embodiment of the disclosure.

Referring to FIG. 3, according to an embodiment of the disclosure, the tester 200 includes a firmware storage 210, a security function requester 220, a user authenticator 230, and a firmware transmitter 240.

First, the firmware storage 210 may be a storage region of the tester 200 in which the security function firmware of the disclosure is stored. The security function firmware is firmware that includes a function of storing, changing, or deleting a value of protected memory of the ECU 100. According to an embodiment of the disclosure, the security function firmware is not included in the ECU 100 and may be provided from the tester 200 and operate on a volatile memory of the ECU 100. The reason thereof is to prevent the ECU 100 from including the security function firmware itself, because contents of the protected memory of the ECU 100 may be changed by a hacking attack when the ECU 100 embeds the security function firmware. Therefore, the firmware storage 210 of the tester 200 according to an embodiment of the disclosure may store security function firmware to be provided to the ECU 100.

Next, the security function requester 220 requests a security function loader to the ECU 100. At this time, the ECU 100 to which the security function loader is requested may be in a security function setting mode that is a special mode for setting a security mode.

Next, the user authenticator 230 performs user authentication to determine whether the tester 200 is properly authorized in response to a request from the ECU 100.

Next, the firmware transmitter 240 provides the security function firmware to the ECU 100 when the user authentication is completed by the user authenticator 230. At this time, the security function firmware performs a security function instruction when normally loaded to the ECU 100. The security function instruction may modify contents stored in the protected memory of the ECU 100, activate or deactivate a security function, or temporarily disable the ECU 100.

Figure 4:
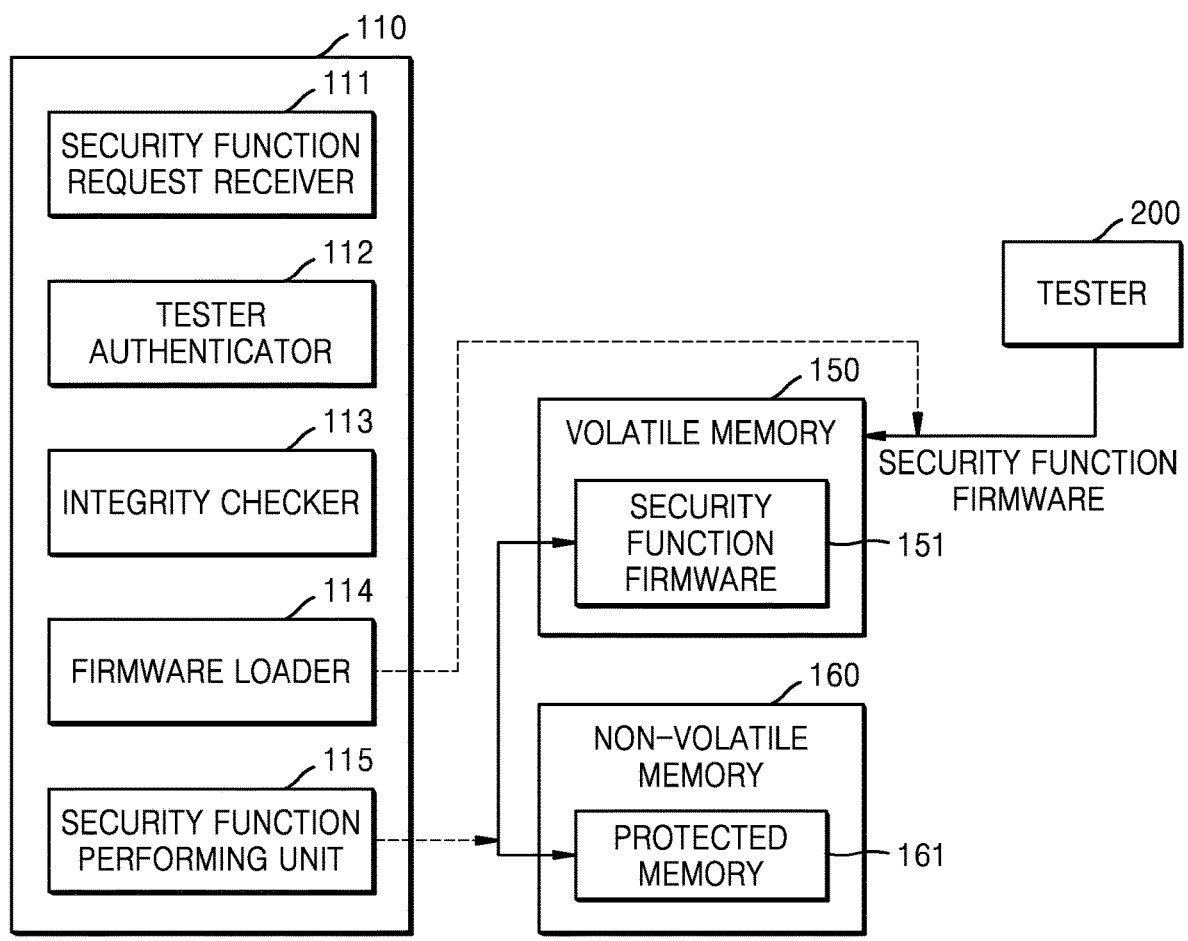
FIG. 4 is a block diagram showing the internal configuration of a microcontroller according to an embodiment of the disclosure.
Figure 5:
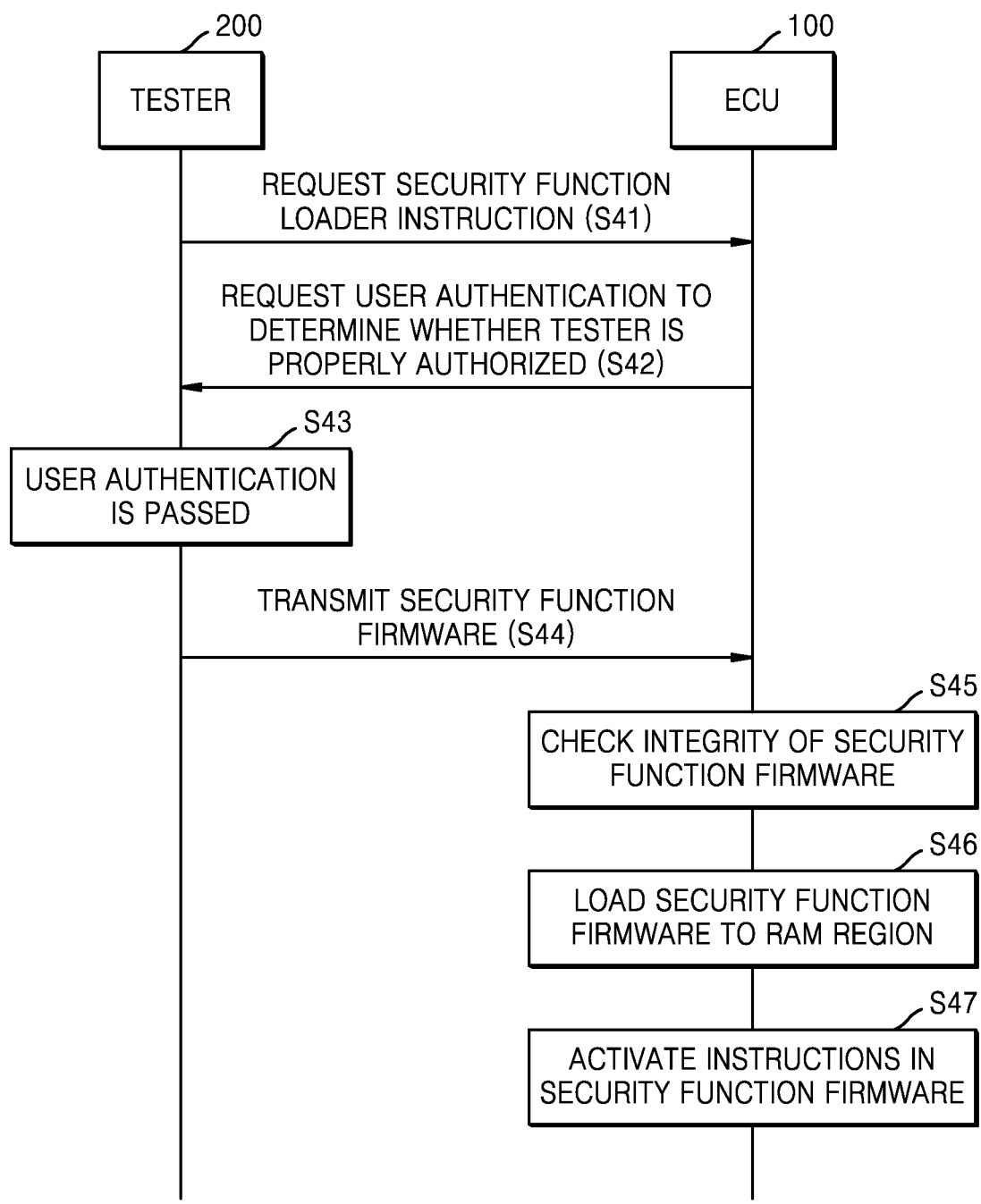
FIG. 5 is a diagram showing a security function setting method according to an embodiment of the disclosure in the chronological order.

FIG. 4 is a block diagram showing the internal configuration of the microcontroller 120 according to an embodiment of the disclosure, and FIG. 5 is a diagram showing a security function setting method according to an embodiment of the disclosure in the chronological order. Hereinafter, descriptions will be given below with reference to FIGS. 4 and 5 together.

Referring to FIG. 4, the microcontroller 110 according to an embodiment of the disclosure may include a security function request receiver 111, a tester authenticator 112, an integrity checker 113, a firmware loader 114, and a security function performing unit 115. As described above, the volatile memory 140 and the non-volatile memory 150 may be included in the microcontroller 110.

First, the security function request receiver 111 receives a security function loader instruction request from the tester 200 (operation S41). At this time, the ECU 100 may be in a special mode for setting a security function.

Next, the tester authenticator 112 requests user authentication to determine whether the tester 200 requesting the security function loader instruction is properly authorized (operation S42). The tester 200 receives a user authentication request and passes and completes a requested user authentication (operation S43). After the user authentication is completed, the tester 200 transmits security function firmware to the ECU 100 (operation S44).

Next, the integrity checker 113 checks the integrity of the security function firmware, which is received from the tester 200, during the transmission/reception process through the communication network 300 by using an electronic signature (operation S45).

Next, the firmware loader 114 temporarily loads the security function firmware 151 to the volatile memory 140 when the security function firmware passes an integrity check (operation S46). Here, temporarily loading means that, since the security function firmware is loaded to the volatile memory 140, the security function firmware will be deleted after the ECU 100 is reset. The volatile memory 140 may be a RAM. Also, the tester 200 transmits the security function firmware in an executable binary form (e.g., a *.HEX file in an embedded environment).

According to an embodiment of the disclosure, the firmware loader 114 temporarily loads security function firmware 151 provided from the tester 200 to the RAM. According to an embodiment of the disclosure, the security function firmware 151 is temporarily loaded to the volatile memory 140, because the security function firmware needs to be limitedly available only when both a user authentication and an integrity check of the security function firmware are passed. In other words, the security function firmware disappears when the ECU 100 is reset to prevent the security function firmware from being permanently included in the ECU 100 and abused by a hacking attack.

Next, the security function performing unit 115 activates critical instructions existing in the security function firmware loaded in the RAM (operation S47). In other words, the security function performing unit 115 performs a security function instruction after the security function firmware loader instruction is normally performed. At this time, a critical instruction is an instruction for generating or changing information stored in a protected memory 161 in the non-volatile memory 160 and may be an instruction for setting a security function of the disclosure. In the disclosure, the security function refers to a function for modifying contents stored in a protected memory, activating or deactivating the security function, or temporarily disabling the security function (however, the security function may be re-enabled after an ECU is reset).

Since there is not security function codes in the volatile memory 150 of the ECU 100, a security function is deactivated. Therefore, according to the disclosure, security function instructions may only be activated through a security function loader that loads the security function firmware 151.

In other words, a security function instruction may not be activated by itself unless the security function firmware is loaded, and thus, according to the disclosure, the contents of the protected memory 161 may be prevented from being changed by an ECU due to a hacker's attack. Also, according to the disclosure, since the security function firmware is loaded only through the tester 200 that passed a user authentication and an integrity check outside the ECU 100, the ECU 100 may be prevented from activating a security function by itself.

In other words, according to an embodiment of the disclosure, the security function firmware 151 is used to input, modify, and delete setting values in a protection memory region, and the security function firmware 151 is not included in the firmware of the ECU 100 that is released in production. Therefore, according to an embodiment of the disclosure, since a logic for controlling a security function is not leaked through the reverse engineering of a hacker, a protected memory region may be prevented from being arbitrarily controlled by a hacker's attack (e.g., setting values are arbitrarily changed or a security function is disable).

The disclosure has been described above based on the ECU 100 or the tester 200. Meanwhile, according to another embodiment of the disclosure, methods related to operations of the ECU 100 and the tester 200 may be implemented as an embodiment. In other words, according to another embodiment of the disclosure, the operations of the ECU 100 or the tester 200 described herein may be implemented as a method including time series operations, wherein the subject of the method may not necessarily be the ECU 100 or the tester 200. For example, a method of performing the operations described in FIG. 5 may be an embodiment of the disclosure, wherein the method of performing the operations may be performed by a device other than the ECU 100 and the tester 200 or a processor.

For example, the subject performing the method according to another embodiment of the disclosure may be a processor embedded in the ECU 100 or the tester 200, wherein instructions stored in the processor may control the ECU 100 or the tester 200 according to embodiments of the disclosure. Therefore, the case may be applied to electronic ECUs in various fields using a CAN communication, such as construction heavy equipment and agricultural tractors, as well as automobiles. Similarly, the subject performing method according to other embodiments of the disclosure may be an auxiliary controller connected to the ECU 100 or the tester 200 in the form of a H/W type connector. In this case, the auxiliary controller may be simply connected to the ECU 100 or the tester 200, and thus it is not necessary to make H/W or S/W modification. Alternatively, the subject performing the method according to another embodiment of the disclosure may be a semiconductor device embedded in the ECU 100 or the tester 200, and a S/W of the semiconductor device may be designed to perform the method of the disclosure.

Particular implementations described in the disclosure are merely embodiments and do not limit the scope of the disclosure in any way. For brevity of description, descriptions of conventional electronic configurations, control systems, software, and other functional aspects of the systems may be omitted. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Also, unless specifically mentioned as "essential", "important", components may not be necessary components for the application of the disclosure.

In the specification (particularly in the claims) of the disclosure, the use of the term "said" and similar indicating terminology may correspond to both the singular and the plural. Also, in the disclosure, when the range is described, it includes the disclosure to which the individual values belonging to the range are applied, and (if there is no description thereof) it is considered that each individual value constituting the range is described in the detailed description of the disclosure. Finally, if there is no explicit order or contrary to the steps constituting the method according to the disclosure, the steps may be carried out in a suitable order. The disclosure is not necessarily limited to the described order of the above steps. The use of all examples or exemplary terms (e.g., etc.) in the disclosure is merely for the purpose of describing the disclosure in detail, and the scope of the disclosure is not limited by the above examples or exemplary terms unless defined by the claims. Also, one of ordinary skill in the art appreciates that various modifications, combinations and changes can be made in accordance with design conditions and factors within the scope of the appended claims or their equivalents.

Embodiments according to the disclosure described above can be implemented in the form of program instructions that can be executed by various computer components and recorded in a computer-readable recording medium. The computer-readable recording medium may include program instructions, data files, data structures, etc. alone or in combination. Program instructions recorded on the computer-readable recording medium may be specially designed and configured for the disclosure, or may be known and available to those skilled in the computer software arts. Examples of computer-readable recording media include magnetic media such as hard disks, floppy disks and magnetic tape, optical recording media such as CD-ROMs and DVDs, and magneto-optical media such as floptical disks, and hardware devices specifically configured to store and execute program instructions, such as ROM, RAM, flash memory, and the like. Examples of program instructions include machine language code such as code generated by a compiler, as well as high-level language code that may be executed by a computer using an interpreter or the like. Hardware devices may be modified with one or more software modules to perform the processing according to the disclosure, and vice versa.

Although the disclosure has been described by specific matters such as specific components and limited embodiments and drawings, this is only provided to help a more general understanding of the disclosure, and the disclosure is not limited to the above embodiments. Those skilled in the art may make various modifications and changes from this description.

Therefore, the spirit of the disclosure should not be limited to the above-described embodiments, and the scope of the spirit of the disclosure is defined not only in the claims below, but also in the ranges equivalent to or equivalent to the claims.

What is claimed is:

1. An electronic control unit (ECU) security function setting system comprising:
    an ECU; and
    a tester connected to the ECU through a communication network,
    wherein:
    the ECU includes:
        a volatile memory; and
        a non-volatile memory including a protected memory region, the protected memory region being a hidden region inside the non-volatile memory that is accessible with a particular command sequence to store, change or delete data in the protected memory region;
    the tester comprises a processor and a firmware storage that stores a security function firmware including instructions;
    wherein the security function firmware is not stored in the non-volatile memory of the ECU and provided to the volatile memory of the ECU from the tester; and
    wherein the ECU is operable to:
        receive the security function firmware from the tester;
        temporarily load the security function firmware into the volatile memory;
        activate the instructions in the security function firmware; and
        perform a security function setting by storing, changing, or deleting data in the protected memory region.

2. The ECU security function setting system of claim 1, wherein the ECU and the tester operate as watchdog-based instruction interpreters.

3. The ECU security function setting system of claim 1, wherein the ECU checks integrity of the received security function firmware during transmission and reception through the communication network, and then activates the instructions in the security function firmware.

4. The ECU security function setting system of claim 1, wherein data in the protected memory region is modifiable by activating the instructions in the security function firmware loaded into the volatile memory.

5. The ECU security function setting system of claim 1, wherein an instruction fetch used to execute an instruction in the protected memory region is allowed, and an access to the protected memory region through an address value is blocked.

6. The ECU security function setting system of claim 1, wherein the security function firmware loaded into the volatile memory disappears when the ECU is reset.

7. An electronic control unit (ECU) security function setting method comprising:
   storing a security function firmware including instructions in a firmware storage of a tester, wherein the security function firmware is not stored in a non-volatile memory of an ECU;
   requesting, by the tester connected to the ECU through a communication network, a security function loader to the ECU when an ECU is in a security function setting mode;
   performing, by the tester, receiving a user authentication request from the ECU and performing an user authentication;
   transmitting, by the tester, the security function firmware to the ECU when the user authentication is passed;
   receiving, by the ECU, the security function firmware from the tester;
   checking, by the ECU, integrity of the security function firmware;
   temporarily loading, by the ECU, the security function firmware into a volatile memory of the ECU; and
   activating, by the ECU, the instructions in the security function firmware; and
   performing, by the ECU, a security function setting by storing, changing, or deleting data in a protected memory region in the non-volatile memory of the ECU;
   wherein the protected memory region is a hidden region inside the non-volatile memory that is accessible with a particular command sequence to store, change or delete data in the protected memory region.

8. The ECU security function setting method of claim 7, wherein data in the protected memory region is modifiable by activating the instructions in the security function firmware loaded into the volatile memory.

9. The ECU security function setting method of claim 7, wherein an instruction fetch used to execute an instruction in the protected memory region is allowed, and an access to the protected memory region through an address value is blocked.

10. The ECU security function setting method of claim 7, wherein the security function firmware loaded into the volatile memory disappears when the ECU is reset.

11. A computer program stored in a non-transitory computer readable recording medium for carrying out an electronic control unit (ECU) security function setting method, the method comprising:
   storing a security function firmware including instructions in a firmware storage of a tester, wherein the security function firmware is not stored in a non-volatile memory of an ECU;
   requesting, by the tester connected to the ECU through a communication network, a security function loader to the ECU when an ECU is in a security function setting mode;
   performing, by the tester, receiving a user authentication request from the ECU and performing an user authentication;
   transmitting, by the tester, the security function firmware to the ECU when the user authentication is passed;
   receiving, by the ECU, the security function firmware from the tester;
   checking, by the ECU, integrity of the security function firmware;
   temporarily loading, by the ECU, the security function firmware into a volatile memory of the ECU; and
   activating, by the ECU, the instructions in the security function firmware; and
   performing, by the ECU, a security function setting by storing, changing, or deleting data in a protected memory region in the non-volatile memory of the ECU;
   wherein the protected memory region is a hidden region inside the non-volatile memory that is accessible with a particular command sequence to store, change or delete data in the protected memory region.

* * * * *